United States Patent
Clark et al.

[15] 3,695,676
[45] Oct. 3, 1972

[54] AUTOMOBILE CAMPER MOUNTING

[72] Inventors: Arthur C. Clark; Ted Timmons, both of San Jose, Calif.

[73] Assignee: Holiday Vehicle Specialties, Inc., Mountain View, Calif.

[22] Filed: June 10, 1971

[21] Appl. No.: 151,795

[52] U.S. Cl. ..............................296/23 MC, 296/99
[51] Int. Cl. ............................................B60p 3/32
[58] Field of Search..............296/23, 26, 23 MC, 99

[56] References Cited

UNITED STATES PATENTS 3,635,515  1/1972  White...................296/23 MC
3,290,084  12/1966  McPherson............296/23 MC

*Primary Examiner*—Philip Goodman
*Attorney*—Paul F. Morgan

[57] ABSTRACT

An adjustable arrangement for mounting a camper unit to varying conventional automobile trunk openings by easily adjustable mounting units which mount along the rain gutter at the edge of the automobile trunk opening to provide distributed load transmission between the camper unit and the trunk rain gutter.

10 Claims, 7 Drawing Figures

PATENTED OCT 3 1972      3,695,676
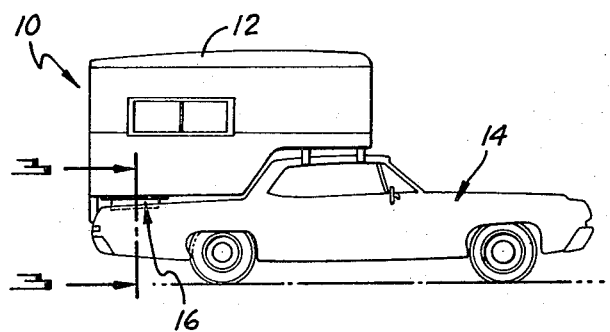
FIG_1
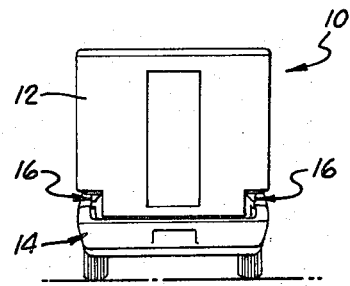
FIG_2
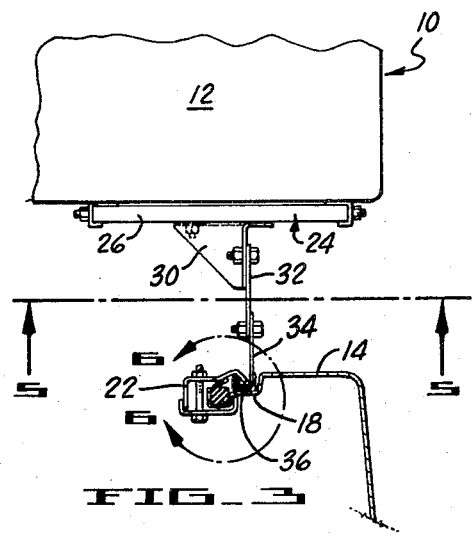
FIG_3
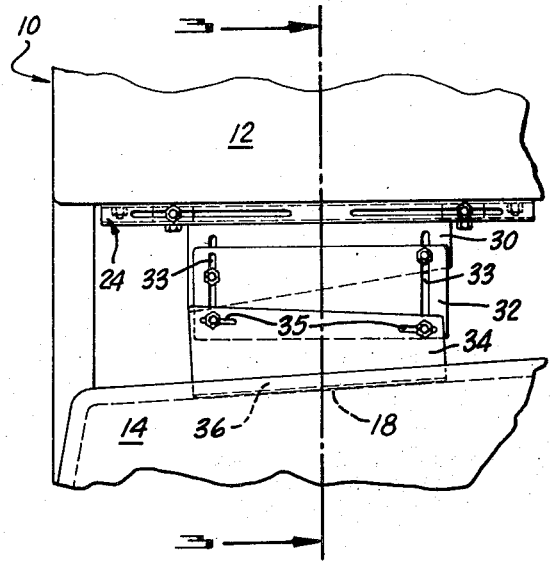
FIG_4
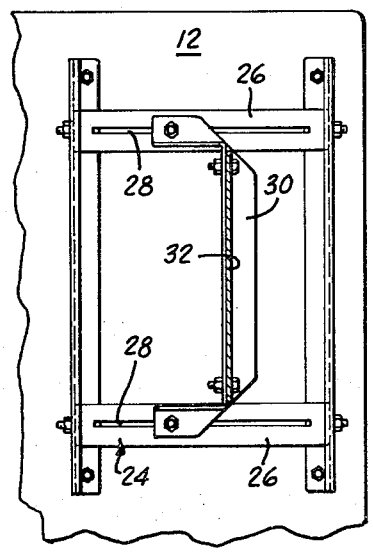
FIG_5
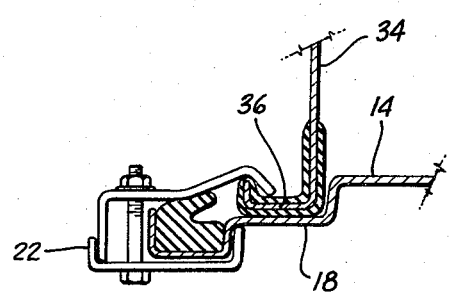
FIG_6
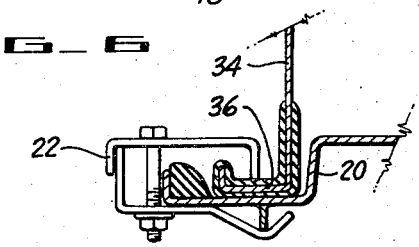
FIG_7

AUTOMOBILE CAMPER MOUNTING

The invention relates to an adjustable apparatus for mounting a camper unit to the rain gutter of various automobile trunk openings. By the present invention a car tip camper unit may be securely mounted to overlay or extend into the trunks of existing automobiles, without requiring connection to, or support by, the trunk floor. The camper unit is supported by the automobile through simple adjustable mounting units which transfer and distribute the load along a substantial area of the trunk rain gutter. Clamping means are also taught for directly clamping the mounting units securely within the rain gutter.

The rain gutter extending along both sides of any automobile trunk opening is an area of the automobile body having inherent overall beam strength due to its channeled configuration. It also often has additional reinforcement. Thus it is a good point for load transfer from a camper unit to the automobile body, providing the load can be distributed along a substantial area of the rain gutter, and also providing that the widely varying sizes, shapes, slopes and spacings of the various present and future automobile trunk rain gutters can be accommodated. The present invention teaches a simple yet effective arrangement for providing these and other features and advantages.

Further objects, features and advantages of the invention pertain to the particular arrangement and structure whereby the above-mentioned aspects of the invention are attained. The invention will be better understood by reference to the following description and to the drawings forming a part thereof, wherein;

FIG. 1 is a side view of an exemplary camper arrangement embodying the present invention;

FIG. 2 is a rear view of the camper arrangement of FIG. 1;

FIG. 3 is an enlarged cross-sectional view taken along the line 3—3 of FIGS. 1 and 4;

FIG 4 is an enlarged side view of a mounting unit of the camper arrangement of FIG. 1;

FIG. 5 is a cross-sectional view taken along the line 5—5 of FIG. 3;

FIG. 6 is an enlarged view of the portion 6—6 of FIG. 3; and

FIG. 7 is similar to FIG. 6, illustrating the same clamp as shown (invented) in FIG. 6 but with a different automobile trunk rain gutter.

Referring to the drawings, FIG. 1–7, there is shown an exemplary camper arrangement 10 in accordance with the present invention which is applicable to a wide variety of automobiles and camper units therefor. In this arrangement 10 a camper unit 12 is mounted to a conventional automobile 14 by a pair of adjustable mounting units 16, each extending upwardly from one side of the automobile trunk rain gutter 18 (20 in FIG. 7) to a bottom surface area of the camper unit 12 to support the camper unit. The principal portion of the camper unit load is supported through the mounting units 16 by an elongate area of the trunk rain gutter 18. The mounting units 16 are clamped to the trunk rain gutter 18 by a clamp 22, shown most clearly in FIG. 7 and (inverted) in FIG. 6. As shown in FIG. 1, the front of the camper unit 12 may be provided with additional supports mounting to the automobile roof rain gutter in a conventional manner.

The details of the novel mounting units 16 are shown clearly in rear, side and bottom views in FIG. 3, 4 and 5 respectively. FIG. 6 enlarges a portion of FIG. 3 to better illustrate the details of the mounting of the mounting unit 16 to the trunk rain gutter 18, and the associated clamp 22. FIG. 7 similarly shows these same components applied to a different trunk rain gutter 20 with the same clamp 22 reversed in position. As the two mounting units 16 are preferably identical, only one need be described herein.

Each mounting unit 16 provides a simple but wide range adjustment for height and tilt positioning and horizontal positioning in both horizontal axes. The mounting unit 16 is completely adjustable to fit almost any automobile camper unit to almost any size, position and configuration of trunk opening and trunk rain gutter. This adjustability is provided by a simple and easily operable structure with good rigidity characteristics.

The uppermost component of the mounting unit 16 is an adjustable rack 24 which provides an adjustable load-distributing support for the camper unit 12. It may be seen that the under-seat areas are generally horizontal and readily accessible bottom surface areas of the camper unit 12 which are spaced above the trunk opening and extending outwardly over the trunk rain gutters at each side. Thus the under-seat areas are utilized for the mounting. The central portion of the camper unit is free to extend down fully into the trunk opening without interference and without requiring any connection to the trunk floor in the present mounting arrangement.

The exemplary rack 24 has a spaced pair of longitudionally extending slotted bars abutting and attached to an under-seat area of the camper unit 12. Extending therebetween are a spaced apart pair of transversely extending cross-arms 26. The cross-arms 26 are adjustably mounted to the longitudinal bars by means of bolts extending through the longitudionally extending slots therein. This provides for longitudional positioning adjustment of the cross-arms 26 on the rack 24. The cross-arms 26 in turn are provided with elongate transverse slots 28 thereacross adopted to receive fastening bolts anywhere therealong.

Slidably mounted under the rack 24 to the transverse slots 28 is the horizontal base portion of a bracket 30, which thereby is fully laterally adjustable in position along the cross-arms 26 to adjust to the width of the trunk opening. The bracket 30 has a vertical extending downwardly at right angles from its base portion. This vertical portion, as may be seen in FIG. 4 for example, is a metal plate with spaced vertically elongate fastener-receiving apertures at its front and rear. Preferably, as shown, the rear end of the bracket 30 extends downwardly further than the front end, to provide for the rearward down-slope of most automobile trunk openings.

An extending plate 32 is shown here fastened between the bracket 30 and the lower mounting member 34. However, this extension plate 32 is removable, and would not be employed where the vertical extension it provides is not needed. (In that case the bracket 30 is fastened directly to the mounting member 34 in the same manner.) It may be seen that the extension plate 32 is a flat metal plate which partially overlaps the vertical plate portion of the bracket 30 and contains equidistantly spaced and corresponding vertical elongate slots 33. Thus the extension plate 32 can be simply bolted by two bolts to the bracket 30 in any desired vertical extension, yet does not affect the fastening arrangement with the mounting member 34 since the same slot spacings are maintained.

The lower mounting member 34 integrally adjustably connects with the above-described mounting components by means of a pair of correspondingly spaced, but horizontal, fastner receiving slots 35 in registry with the slots 33 of the extension plate 32 (and the slots in bracket 30). The mounting member 34 has a vertical plate portion which adjustably overlaps the extension plate 32 and/or the vertical portion of the bracket 30. This provides a rigid connection simply with bolts through the respective overlapping slots 33 and 35 pulling the plates together, yet this connection can provide both height and tilt adjustment, since the horizontal slots 35 in the mounting member 34 allow it to be tilted with respect to the bracket 30 and still have registry of the overlapping slots. The tilt adjustment of the mounting member 34 allows it to be tilted with respect to the bracket 30 and still have registry of the overlapping slots. The tilt adjustment of the mounting member 34 allows it to easily adjust to the slope of the particular trunk rain gutter.

Considering further the mounting member 34, as particularly shown in FIGS. 6 and 7 it has an elongate load bearing edge surface formed by a narrow horizontal flange 36 extending linearly along its entire bottom edge. This mounting flange 36 provides the load-transmitting area of the mounting unit 16 with the automobile 14. It is configured to continuously abut the inside of a conventional automobile trunk rain gutter at one side of the trunk opening along a substantial portion of the rain gutter, so as to distribute the load of the camper unit evenly along a substantial length of the trunk rain gutter. The flange 36 is narrower than the trunk rain gutter, and preferably is sufficiently narrow to fit between the weather stripping in the trunk rain gutter and the outside edge of the trunk rain gutter. A layer of resilient material is preferably provided on the flange 36 between the flange 36 and the rain gutter to further improve uniform load distribution and to provide a high static fraction abutment. Conventional plastic resin or vinyl rubber coatings may be used for this purpose.

The weight of the camper unit normally retains the flange 36 within the trunk rain gutter. For security and retention against lifting forces due to bouncing of the vehicle a simple clamp 22 is provided directly at the flange 36, where it is readily accessible. The clamp 22 clamps the flange 36 to the rain gutter by an opposing pair of adjustable jaws, one of which abuts the top of the flange 36 and the other of which abuts the bottom of the rain gutter. The two jaws hindgedly overlap and their inner ends are drawn together by an intermediate bolt. Preferably the outer ends of the two jaws are differently arcuately configured as shown for conforming to varying rain gutters. For example the clamp 22 is reversed in FIG. 6 to fit the rain gutter 18, in contrast to the position of the clamp 22 in FIG. 7 where it fits around the rain gutter 20, since the rain gutter 20 has a reinforcing flange extending below its bottom surface.

It may be seen that there has been described herein an improved mounting arrangement for mounting a camper unit to an automobile. While the apparatus described herein is presently considered to be preferred, it is contemplated that further variations and modifications within the purview of those skilled in the art can be made. The following claims are intended to cover all such variations and modifications as fall within the true spirit and scope of the invention.

What is claimed is:

1. In a camper arrangement wherein a camper unit is mounted to a conventional existing automobile trunk opening, The improvement comprising adjustable mounting units for mounting the camper unit to widely differently configured trunk openings utilizing the conventional existing trunk rain gutters at the sides of said trunk openings, wherein each said adjustable mounting unit includes:

a first mounting member with an elongate load-bearing edge surface, said load-bearing edge surface being adopted to abut the inside of a conventional automobile trunk rain gutter at one side of the trunk opening along a substantial portion of said trunk rain gutter, a second mounting member adopted to adjustably integrally mount to said camper unit, connecting means integrally interconnecting said first and second mounting members adjustable to the spacing and angular position between said camper unit and said rain gutter, said interconnecting first and second mounting members providing vertical load transmission between said camper unit and said trunk rain gutter, and clamping means for retaining said load bearing edge surface of said first mounting member in said rain gutter.

2. The camper arrangement of claim 1 wherein said clamping means has opposing jaws for applying a clamping force between the top of said load bearing edge and the bottom of said rain gutter.

3. The camper arrangement of claim 1 wherein said load bearing edge of said first mounting member is an elongate horizontally extending flange having a width less than the width of a conventional automobile trunk rain gutter.

4. The camper arrangement of claim 3 wherein a layer of resilient material is provided on said flange between said flange and said rain gutter.

5. The camper arrangement of claim 3 wherein said trunk rain gutter contains weather stripping along its inside edge and said flange is sufficiently narrow to fit between said weather stripping and the outside edge of said trunk rain gutter.

6. The camper arrangement of claim 1 wherein said first and second mounting members comprise adjustably overlapping metal plates and said connecting means comprises multiple elongate slotted fastner-receiving apertures in said metal plates correspondingly spaced to adjustably overlap one another.

7. The camper arrangement of claim 6 wherein said connection means interconnecting said first and second mounting members further includes a removable extension plate with vertically slotted apertures corresponding in spacing to said slotted fastner-receiving apertures in said first and second mounting members.

8. The camper arrangement of claim 1 wherein at least one of said first or second mounting members has an unbalanced extension from said load bearing edge surface and is reversible for increased angular adjustment therebetween.

9. The camper arrangement of claim 1 wherein said second mounting member includes an adjustable rack underlying a substantial bottom surface area of said camper unit for load distribution.

10. The camper arrangement of claim 1 wherein said clamping means has opposing jaws for applying a clamping force between the top of said load bearing edge and the bottom of said rain gutter, and wherein said load bearing edge of said first mounting member is an elongate horizontally extending flange having a width less than the width of a conventional automobile trunk rain gutter with a layer of resilient material provided on said flange between said flange and said rain gutter, and wherein said first and second mounting members comprise adjustably overlapping metal plates and said connecting means comprises multiple elongate slotted fastner-receiving apertures correspondingly spaced in said slotted plantes to adjustably overlap one another, and wherein said second mounting member includes an adjustable rack underlying a substantial bottom surface area of said camper unit for load distribution.

* * * * *